United States Patent
Henry (10) Patent No.: US 11,083,955 B2
(45) Date of Patent: Aug. 10, 2021

(54) IMPACT PLATE HAVING OPTIMIZED DIMENSIONS

(71) Applicant: NIKE, Inc., Beaverton, OR (US)

(72) Inventor: Ryan P. Henry, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 367 days.

(21) Appl. No.: 15/969,450

(22) Filed: May 2, 2018

(65) Prior Publication Data

US 2018/0318696 A1    Nov. 8, 2018

Related U.S. Application Data (60) Provisional application No. 62/501,449, filed on May 4, 2017, provisional application No. 62/501,453, filed on May 4, 2017.

(51) Int. Cl.
*A63B 71/12*    (2006.01)
*A41D 13/05*    (2006.01)
(Continued)

(52) U.S. Cl.
CPC ........ *A63B 71/1225* (2013.01); *A41D 13/015* (2013.01); *A41D 13/0575* (2013.01); *A41D 13/0581* (2013.01); *A41D 27/20* (2013.01); *B32B 3/30* (2013.01); *B32B 5/02* (2013.01); *B32B 5/024* (2013.01); *B32B 5/026* (2013.01); *B32B 5/18* (2013.01); *B32B 5/245* (2013.01); *B32B 27/065* (2013.01); *B32B 27/12* (2013.01);
(Continued)

(58) Field of Classification Search
CPC ..... A63B 71/1225; A63B 71/08; A63B 71/12; A63B 2071/1258; A41D 13/015; A41D 13/0153; A41D 13/0575; A41D 13/0581; A41D 27/20
See application file for complete search history.

(56) References Cited

U.S. PATENT DOCUMENTS 555,584 A    3/1896    Pleukharp
3,906,943 A    9/1975    Arluck
(Continued)

FOREIGN PATENT DOCUMENTS

AU    2011289321 A1    3/2013
CA    2764089 A1    7/2013
(Continued)

OTHER PUBLICATIONS

2010 Sustainable Development Report. Yayork Plastical Products (S.Z) Co., Ltd. , May 2011, 211.75.177.199/pdf/Sustainable_Developement_Report.pdf. (Year: 2011).*
(Continued)

*Primary Examiner* — Sally Haden
(74) *Attorney, Agent, or Firm* — Shook Hardy & Bacon LLP (57) ABSTRACT

An impact plate system is provided herein comprising a moldable plate having center, a first surface, and a second surface opposite the first surface. The first surface and the second surface define a thickness therebetween. The thickness is between 4 mm and 7 mm. The moldable plate is defined by a perimeter edge, which comprises one or more curved corners having a predetermined radius of curvature between 18 mm to 28 mm.

5 Claims, 6 Drawing Sheets

(51) Int. Cl.

| | | |
|---|---|---|
| *A41D 13/015* | (2006.01) | |
| *A41D 27/20* | (2006.01) | |
| *B32B 3/30* | (2006.01) | |
| *B32B 5/02* | (2006.01) | |
| *B32B 27/12* | (2006.01) | |
| *B32B 27/20* | (2006.01) | |
| *B32B 27/26* | (2006.01) | |
| *B32B 27/40* | (2006.01) | |
| *B32B 5/18* | (2006.01) | |
| *B32B 5/24* | (2006.01) | |
| *B32B 27/06* | (2006.01) | |

(52) U.S. Cl.
CPC ............ *B32B 27/20* (2013.01); *B32B 27/26* (2013.01); *B32B 27/40* (2013.01); *A41D 13/0153* (2013.01); *A41D 13/0518* (2013.01); *A41D 13/0537* (2013.01); *A41D 13/0543* (2013.01); *A41D 13/0562* (2013.01); *A41D 13/0568* (2013.01); *A63B 71/12* (2013.01); *A63B 2071/1208* (2013.01); *A63B 2071/1241* (2013.01); *A63B 2071/1275* (2013.01); *B32B 2250/04* (2013.01); *B32B 2266/025* (2013.01); *B32B 2266/0207* (2013.01); *B32B 2307/51* (2013.01); *B32B 2307/558* (2013.01); *B32B 2307/56* (2013.01); *B32B 2307/732* (2013.01); *B32B 2437/00* (2013.01); *B32B 2571/00* (2013.01)

(56) References Cited

U.S. PATENT DOCUMENTS

| | | | |
|---|---|---|---|
| 4,197,342 | A | 4/1980 | Bethe |
| 4,252,910 | A | 2/1981 | Schaefer |
| 5,003,633 | A | 4/1991 | Itoh |
| 5,035,069 | A | 7/1991 | Minden |
| 5,405,312 | A | 4/1995 | Jacobs |
| 5,421,809 | A | 6/1995 | Rise |
| 5,450,625 | A | 9/1995 | Hu |
| 5,625,896 | A | 5/1997 | LaBarbera et al. |
| 5,842,475 | A | 12/1998 | Duback et al. |
| 5,890,224 | A | 4/1999 | Clark |
| 5,924,140 | A | 7/1999 | Chi |
| 5,980,474 | A | 11/1999 | Darcey |
| 6,093,468 | A | 7/2000 | Toms et al. |
| 6,131,195 | A | 10/2000 | Foreman |
| 6,139,217 | A | 10/2000 | Reuter |
| 6,145,134 | A | 11/2000 | Davis et al. |
| 6,178,556 | B1 | 1/2001 | Foreman et al. |
| 6,226,795 | B1 | 5/2001 | Winningham |
| 6,269,485 | B1 | 8/2001 | Foreman |
| 6,478,760 | B2 | 11/2002 | Darcey |
| 6,485,446 | B1 | 11/2002 | Brother et al. |
| 6,490,730 | B1 | 12/2002 | Lyden |
| 6,517,501 | B1 | 2/2003 | Slautterback |
| 6,654,960 | B2 | 12/2003 | Cho |
| 6,703,142 | B2 | 3/2004 | Snow |
| 7,043,762 | B2 | 5/2006 | Greenhalgh |
| 8,235,053 | B2 | 8/2012 | Maurello |
| 8,261,369 | B2 | 9/2012 | Sioui et al. |
| 8,414,811 | B1 | 4/2013 | De Santis et al. |
| 8,914,917 | B1 | 12/2014 | Huntsman et al. |
| 9,000,059 | B2 | 4/2015 | Rich |
| 9,247,778 | B2 | 2/2016 | Cleva |
| 2010/0024105 | A1 | 2/2010 | Sims |
| 2011/0061154 | A1 | 3/2011 | Turner et al. |
| 2011/0083340 | A1 | 4/2011 | Leary et al. |
| 2012/0090068 | A1 | 4/2012 | Glass et al. |
| 2013/0025036 | A1 | 1/2013 | Turner |
| 2013/0232697 | A1 | 9/2013 | Chen |
| 2014/0082811 | A1 | 3/2014 | Perlmutter |
| 2014/0298558 | A1 | 10/2014 | Dodd |
| 2015/0128335 | A1 | 5/2015 | Dehni |
| 2018/0326290 | A1* | 11/2018 | Rodrick ............ A41D 13/0153 |

FOREIGN PATENT DOCUMENTS

| | | |
|---|---|---|
| CA | 2899995 A1 | 8/2014 |
| CN | 101991198 B | 11/2013 |
| CN | 103519427 A | 1/2014 |
| CN | 104168784 A | 11/2014 |
| CN | 104245062 A | 12/2014 |
| DE | 4336468 A1 | 4/1995 |
| EP | 2283738 A1 | 2/2011 |
| JP | 07290626 A | 11/1995 |
| WO | 9841118 A1 | 9/1998 |
| WO | 2012021737 A1 | 2/2012 |
| WO | 2013116157 A1 | 8/2013 |
| WO | 2014143153 A1 | 9/2014 |

OTHER PUBLICATIONS

International Preliminary Report on Patentability dated Nov. 14, 2019 in International Patent Application No. PCT/US2018/030855, 9 pages.
International Preliminary Report on Patentability dated Nov. 14, 2019 in International Patent Application No. PCT/US2018/030865, 10 pages.
International Search Report and Written Opinion dated Jul. 31, 2018 in International Patent Application No. PCT/US2018/030855, 15 pages.
BASF: Technical Information Thermoplastic Polyurethane Elastomers (TPU), Nov. 1, 2011, XP055287870, Retrieved from the Internet: URL: http://www.polyurethanes.basf.de/pu/solutions/us/function/conversions:/publish/content/group/Arbeitsgebiete_und_Produkte/Thermoplastishe_Spezialelastomere/Infomaterial/elastollan_material_uk.pdf [retrieved on Jul. 12, 2016] pp. 7-8. Related Foreign App Apr. 21, 2017 Jul. 13, 2017.
Hirschfeld, Cindy, "Gear for a Snowy Getaway-XC 120," The New York Times, nytimes.com, Dec. 11, 2014. http://www.nytimes.com/2014/12/14/travel/gear-for-a-snowy-getaway.html?_r=0 May 1, 2017.
"Soccer Player's Buying Guide—Soccer ShinGuard," World Soccer Shop™, worldsoccershop.com Last Accessed May 21, 2015. http://www.worldsoccershop.com/buyers-guide-shinguards.html May 1, 2017.
EvoShield Webpage. "Game-Changing Protective Apparel". Retrieved Sep. 4, 2016 from the Internet at <https://web.archive.org/web/20160202052600/http://www.evoshield.com/technology/fitting>. 2 pages.
Anonymous: "Thermoplastic—Wikipedia. the free encyclopedia", Nov. 25, 2015 (Nov. 25, 2015), XP055362249, Retrieved from the Internet: URL: https://web-Beta.archive.org/web/20151125104537/https://en.wikipedia.org/wiki/Thermoplastic [retrieved on Apr. 5, 2017] Related Foreign App Apr. 21, 2017 Jul. 13, 2017.
International Search Report and Written Opinion dated Apr. 13, 2017 in International Patent Application No. PCT/US2017/013284, 15 pages.
MotoSport, LLC Webpage. "Forcefield Body Armour Replacement Armour". Retrieved Nov. 29, 2014 from the Internet at <http://web.archive.org/web/20141129194246/http://www.motosport.com/Forcefield-Body-Armour-Replacement-Armour>. 4 pages.
SoccerPro Webpage. "adidas Predator Pro Moldable Shin Guard Ray Green and Black". Retrieved Sep. 24, 2013 from the Internet at <http://web.archive.org/web/20130914112947/http://www.soccerpro.com/adidas-Predator-Pro-Moldable-Shin-Guards-Ray-Green-with-Black-p14663/>. 1 page.
Office Action received for European Patent Application No. 18726653.1, dated Apr. 14, 2020, 6 pages.
Office Action received for European Patent Application No. 18727927.8, dated Apr. 20, 2020, 5 pages.
Office Action received for European Patent Application No. 18726653.1, dated Sep. 4, 2020, 5 pages.
Office Action received for European Patent Application No. 18727927.8, dated Sep. 29, 2020, 6 pages.
Non-Final Office Action received for U.S. Appl. No. 15/969,445, dated Aug. 4, 2020, 19 pages.
Non-Final Office Action received for U.S. Appl. No. 15/969,445, dated Jan. 6, 2021, 19 pages.

(56) References Cited

OTHER PUBLICATIONS

Intention to Grant received for European Patent Application No. 18726653.1, dated Mar. 9, 2021, 7 pages.
Final Office Action received for U.S. Appl. No. 15/969,445, dated Apr. 19, 2021, 17 pages.
"Polyols", Polymer Properties Database, Available online at: <polymerdatabase.com/Polymer%20Brands/Polyols.html>, 2 pages.
Office Action received for European Patent Application No. 18727927.8, dated May 10, 2021, 6 pages.

* cited by examiner

IMPACT PLATE HAVING OPTIMIZED DIMENSIONS

CROSS-REFERENCE TO RELATED APPLICATIONS

This application, entitled "An Impact Plate Having Optimized Dimensions," claims priority to U.S. Application No. 62/501,449, filed May 4, 2017, and entitled "An Impact Plate Having Optimized Dimensions," and further claims priority to U.S. Application No. 62/501,453, filed May 4, 2017, and entitled "Remoldable Impact Plate." The entireties of the aforementioned applications are incorporated by reference herein.

This application, entitled "An Impact Plate Having Optimized Dimensions," is related by subject matter to concurrently filed U.S. patent application Ser. No. 15/969,445, entitled "Remoldable Impact Plate." The entirety of the aforementioned application is incorporated by reference.

TECHNICAL FIELD

The present disclosure relates to an impact pad, such as thigh plate, for an apparel item.

BACKGROUND

Various types of impact plates have been proposed to protect a wearer from impact forces. Athletic apparel often incorporates these impact plates so as to protect the wearer from contact with other athletes, equipment, or the ground. For example, American football and hockey uniforms may incorporate impact plates to provide impact protection to various parts of a wearer. However, many of these impact plates do not have optimized dimensions so as to maximize impact attenuation. As such, many impact plates fail industry-specific impact tests and are therefore inadequate to protect the wearer. Additionally, these impact plates are only moldable when heated to an increased temperature or are only permanently molded after curing. For example, some impact plates may be only be molded prior to applying a curing agent to cure the impact plate into a permanent molded form.

BRIEF DESCRIPTION OF THE DRAWINGS

The present invention is described in detail below with reference to the attached drawings figures, wherein.

DETAILED DESCRIPTION

The subject matter of the present invention is described with specificity herein to meet statutory requirements. However, the description itself is not intended to limit the scope of this disclosure. Rather, the inventors have contemplated that the disclosed or claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Aspects herein are generally directed to an exemplary impact plate to attenuate or reduce the effects of an impact force by incorporating optimized dimensions. The impact plate may comprise, in an exemplary aspect, a center, a first surface, and a second surface opposite the first surface. The first surface and the second surface may define a thickness therebetween. The thickness may be between 4 mm to 7 mm. The impact plate may be defined by a perimeter edge comprising one or more curved corners having a predetermined radius of curvature between 18 mm to 28 mm.

In one exemplary aspect, the impact plate may be integrated into an apparel item. In aspects, the apparel item may comprise an elastically resilient material layer forming a portion of the apparel item where the elastically resilient material layer comprises a first surface. A foam material may be coupled to the first surface of the elastically resilient material layer. Additional aspects include a moldable plate comprising a polymeric material having a thickness between 4 mm to 7 mm. The moldable plate may be coupled to the first surface of the elastically resilient material layer such that the foam material is positioned between the first surface of the elastically resilient material layer and the moldable plate. The moldable plate may be defined by a perimeter edge that comprises one or more curved corners. The one or more curved corners may have a predetermined of radius of curvature between 18 mm to 28 mm.

In another aspect, an apparel item comprises an elastically resilient material layer forming a portion of the apparel item. Further, the elastically resilient material layer may comprise a pocket. The apparel item may comprise a moldable plate comprising a polymeric material. The moldable plate may be defined by a perimeter edge and may have a thickness between 4 mm to 7 mm. The perimeter edge of the moldable plate may comprise one or more curved corners having a predetermined radius of curvature between 18 mm and 28 mm. In addition, the moldable plate may be configured to be received into the pocket.

The configuration thus described may have a number of functional advantages. One advantage gained by an impact plate with optimized dimensions is that, when subjected to impact forces, the plate's dimensions minimize impact pressure peak points across the surface of the plate. As a result, the impact plate maintains excellent impact attenuation. This, in turn, provides for other advantages, such as passing impact standards mandated by certain organizations. By incorporating certain dimensions (e.g., thickness of the impact plate, radius of curvature) the impact plate may pass the standardized impact tests, indicating that it is safe to use within the organization (NCAA, NFL, etc.). While these represent several of the functional advantages, other advantages will be recognized by those skilled in the art.

In another exemplary aspect, an impact plate may have remoldable characteristics, such that the wearer may mold, and re-mold, the impact plate into a configuration. Aspects provide for an impact plate system comprising a textile layer, which comprises a first surface. Additionally, the textile layer may comprise an elastically resilient material. A moldable plate may be coupled to the first surface of the textile layer. The moldable plate, in some aspects, may comprise a polymeric material having a tensile strength within the range of 40 MPa to 50 MPa, according to ASTM D638 standards.

In one exemplary aspect, an impact system comprises an apparel item comprising an elastically resilient material and a moldable plate. The apparel item may comprise a pocket that is configured to removably retain the moldable plate. The moldable plate may comprise a polymeric material having a tensile strength within the range of 40 MPa to 50 MPa, according to ASTM D638 standards.

In another exemplary aspect, an impact plate system may comprise a textile layer comprising at least a first surface. The textile layer may comprise an elastically resilient material that is formed into an apparel item. A moldable plate is coupled to the first surface of the textile layer. The moldable plate may comprise a polymeric material having a tensile strength within the range of 40 MPa to 50 MPa, according to ASTM D638 standards. Accordingly, the moldable plate is moldable to a first configuration.

The aspects described have further functional advantages. In particular, the material properties of the polymeric material used to construct the plate allow it be molded or configured to a wearer's body surface without the use of heat and, critically, without the use of external curing agents. For example, the material properties of the polymeric material used in the plate may include a tensile strength that allows the impact plate to be configured to a wearer's body surface, providing a greater fit and comfort for the wearer. With respect to this aspect, the tensile strength is such that the impact plate may be maintained in a desired configuration when secured to an apparel item formed from an elastically resilient material. For instance, the elastically resilient material may provide enough force to counteract any tendency of the impact plate to return to a non-configured state.

Additionally, the tensile strength of the polymeric material may contribute to the plate's impact resistance. For example, the tensile strength is such that the impact plate will partially absorb an impact force through elastic deformation but also partially deflect the impact force across the surface area of the plate. While these advantages represent only a few of the functional advantages, other advantages will be recognized by those skilled in the art.

To gain an improved understanding of the advantages and features of novelty, reference may be made to the following descriptive matter and accompanying figures that describe and illustrate various configurations and concepts related to the invention. Among other things, the impact plate (or simply "plate" or "moldable plate") may be discrete or coupled with one or more other layers, such as a cushion layer or a garment layer of an apparel item. For illustrative purposes, an exemplary impact plate is depicted in FIGS. 1-5. In addition, FIGS. 6-9 depict an impact plate that is combinable with one or more other layers in a protective article. These various figures will now be described in greater detail.

Figure 1A:
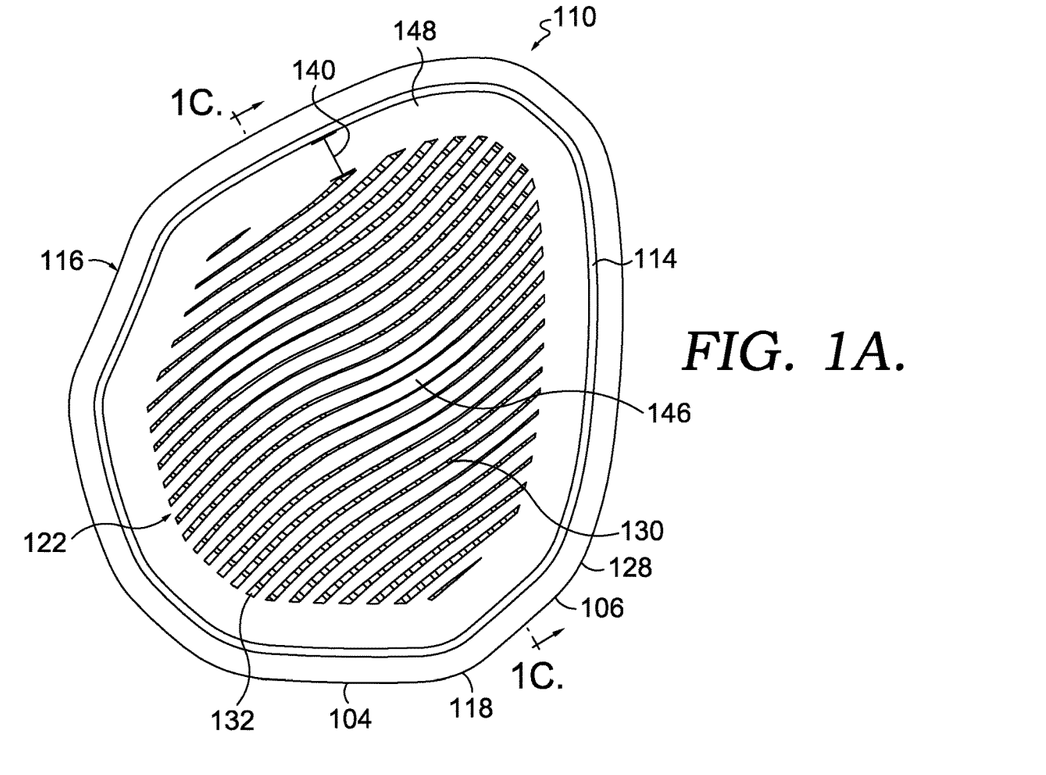
FIG. 1A depicts a plan view of an exemplary impact plate in accordance with aspects herein.
Figure 1B:
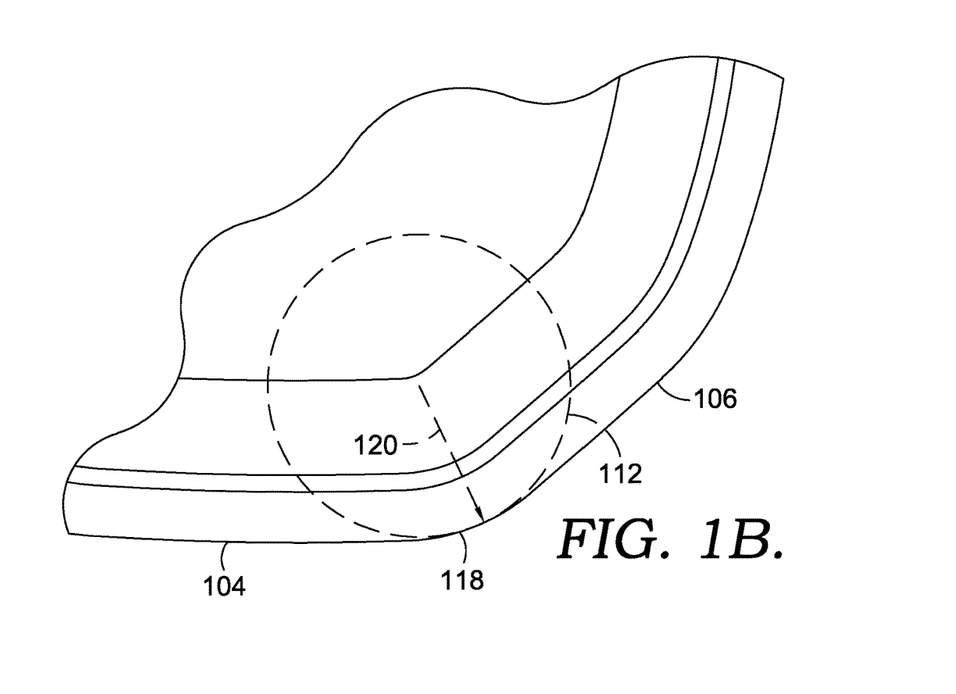
FIG. 1B depicts an enlarged view of an exemplary curved corner of an impact plate having a predetermined radius of curvature in accordance with aspects herein.
Figure 1C:
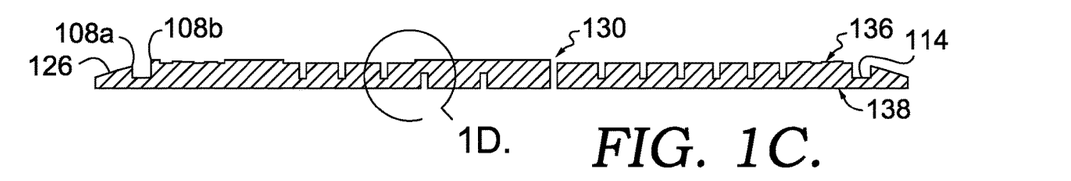
FIG. 1C depicts a cross-sectional view of the impact plate taken at cut line 1C of FIG. 1A in accordance with aspects herein.
Figure 1D:
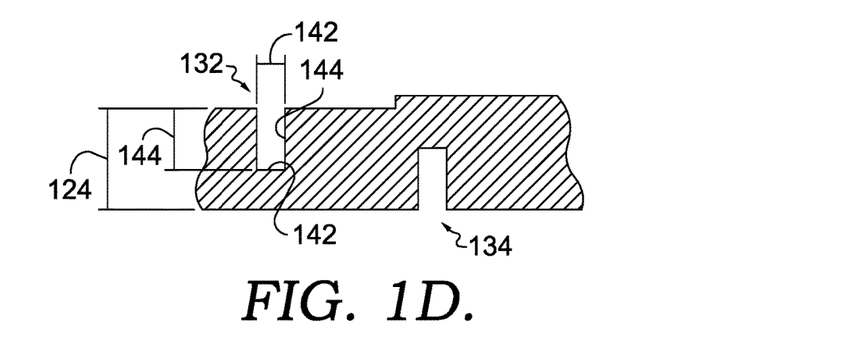
FIG. 1D depicts an enlarged view of the impact plate taken from FIG. 1C in accordance with aspects herein.

Referring to FIGS. 1A, 1C and 1D, an exemplary impact plate 110 is depicted. The impact plate 110 generally includes a first surface 136 and a second surface 138 that is generally opposite the first surface 136. The impact plate 110 may also include a plate thickness 124 that extends between the first surface 136 and the second surface 138. Additionally, the impact plate 110 is surrounded by a perimeter edge 116 that generally defines the shape of the impact plate 110. In aspects, the shape of the impact plate 110 is designed for specific parts of a wearer's body (thigh, chest, ankle, etc.). Accordingly, the perimeter edge 116 may comprise of a series of corners (e.g., 118) and individual perimeter edge sides (e.g., 104) that outline the shape of the impact plate 110 and together make up the perimeter edge 116.

In exemplary aspects, the impact plate 110 may comprise a plate thickness 124 (simply "thickness") between the first surface 136 and the second surface 138 of the impact plate 110. The plate thickness 124 may be substantially constant throughout the impact plate 110 profile, as depicted in FIG. 1C. The plate thickness 124 is said to be substantially constant because, in some aspects, the plate thickness 124 may be altered by a mesh structure 122 comprising a plurality of openings (e.g., 130), a stitching channel 114, or a tapering 126 on or near the perimeter edge 116.

Continuing, the plate thickness 124 may be selected so as to positively affect the impact attenuation and moldability qualities of the impact plate 110. For example, a plate that has a thickness greater than the plate thickness 124 may negatively affect the impact resistance and moldable characteristics. Accordingly, while the impact plate 110 may have a wide range of plate thicknesses 124, in aspects, the plate thickness 124 may range from 4 mm to 7 mm, excluding any decrease in thickness resulting from grooves, channels, tapering, or apertures in the surface of the plate. In further aspects, the plate thickness 124 may range from 4.35 mm to 6.65 mm and/or 4.85 mm to 6.0 mm, excluding any decrease in thickness resulting from grooves, channels, tapering, or apertures in the surface of the plate.

Further, reducing the plate thickness 124, especially in specific parts of the impact plate 110 (e.g., a stitching channel 114), may create high impact pressure points because of a lack of rigidity when the impact plate 110 is subjected to an impact force. To counteract these high impact pressure points, the impact plate may comprise impact pressure peak point resistant regions such as interior portion 148 having an interior portion width 140 for structural stability, thereby maintaining impact resistant performance. These impact pressure peak point resistant regions surround and/or are positioned adjacent to regions having a decrease in thickness (e.g., a stitching channel 114). These zones counteract any increase in impact pressure peak points by having a consistent solid plate body with little to no apertures or openings in the impact plate 110. Additionally, the interior portion 148 may have an increase in plate thickness 124 so as to reinforce areas having a decrease in thickness.

As depicted in FIG. 1B, the perimeter edge 116 may comprise one or more curved corners 118 and one or more perimeter edge sides (e.g., 104). The one or more curved corners 118 may provide a gradual transition from a first perimeter edge side 104 to a second perimeter edge side 106. Generally, the one or more curved corners include optimal dimensions for maintaining the impact attenuation around the perimeter edge 116. For instance, the one or more curved corners may provide a gradual transition from a first perimeter edge side 104 to a second perimeter edge side 106.

The one or more curved corners 118 may have a convex or concave curvature according to the desired shape of the impact plate 110. In addition, although the corners are said to be curved, in some aspects, the one or more curved corners may not be uniformly round or smooth. For example, the one or more curved corners may comprise varying degrees of curvature throughout a gradual transition from a first perimeter edge side 104 to a second perimeter edge side 106. Alternatively, the one or more curved corners may be substantially curved by including a series of lines or line segments that have an overall effect of being a curved corner based on its incremental transition from one side of the perimeter edge to the next, as discussed in greater detail below with reference to FIG. 2.

The one or more curved corners 118 may have a predetermined radius of curvature 120. The radius of curvature 120 is said to be predetermined because it is selected based on its impact attenuation functionality. Hence, the predetermined radius of curvature may also be described as impact attenuation corners. As used herein, the radius of curvature 120 may be defined as the radius of a hypothetical circle 112 drawn through parts of a corner (e.g., 118) of an impact plate 110 such that at least a portion of the circle is coincident with and/or is tangent to the curved corner 118. At least one functional advantage of corners of the impact plate 110 having a predetermined radius of curvature 120 is that it minimizes impact pressure peak points along the perimeter edge 116 as it is transitions from a first perimeter edge side 104 to a second perimeter edge side 106. Accordingly, aspects of the impact plate 110 comprise one or more curved corners 118 having a predetermined radius of curvature 120 that distributes the impact force throughout the one or more curved corners 118 of the perimeter edge 116.

Still, in another aspect, the impact plate may comprise a plurality of substantially curved corners in which all the substantially curved corners may have a minimum radius of the predetermined radius of curvature 120. For example, in one exemplary aspect, the one or more curved corners (e.g., 118) may have a curvature that is greater than the predetermined radius of curvature 120. That is, the impact plate 110 may have a first curved corner 118 comprising a first radius of curvature 120 that is equivalent to the predetermined radius of curvature 120 and a second curved corner 128 comprising a second radius of curvature that is greater than the predetermined radius of curvature 120. Accordingly, the impact plate 110 may have optimal dimensions such that all the corners of the impact plate 110 may have a minimum radius of curvature that enables the deflection of an impact force along its perimeter edge 116, thereby minimizing pressure peak points along the perimeter edge.

As shown in FIG. 1B, in one aspect, the one or more curved corners 118 along the perimeter edge 116 may comprise a predetermined radius of curvature 120 that is between 18 mm to 28 mm, between 19 mm and 26 mm, between 20 mm and 24 mm, and/or between 22 mm and 24 mm. In one exemplary aspect, it is contemplated that the predetermined a radius of curvature may be 23 mm. However, these quantities and ranges are merely exemplary of aspects of the disclosure, and other aspects may include a radius of curvature that is greater than, or less than, the specified ranges.

With reference to FIG. 1A, FIG. 1C, and FIG. 1D the impact plate 110 may comprise a mesh structure 122 having a plurality of openings (e.g., 130) that extend entirely through the plate thickness 124, from the first surface 136 to the second surface 138. In aspects, the mesh structure 122 is created by one or more grooves (e.g., 132) in the first surface 136 intersecting one or more grooves (e.g., 134) in the second surface 138. The one or more grooves (e.g., 132, 134) may have various dimensions, including a height (e.g., 144) and width (e.g., 142).

The groove height (e.g., 144) may vary across the surface of the impact plate 110. Although the groove height 144 in FIG. 1C is shown to be relatively uniform, it is contemplated herein that the groove height 144 may vary. For example, it may increase or decrease as it extends across the surface of the plate 110. Specifically, the groove height 144 may constitute half the plate thickness 124 at a first position of the impact plate 110, while the groove height 144 may be more or less than half the plate thickness 124 at second position.

With regard to the groove width (e.g., 142), in some aspects, one or more first surface grooves (e.g., 132) may have opposing groove language when compared to the one or more second surface grooves (e.g., 134). For example, as depicted in FIGS. 1A and 1D, a first surface groove 132 projecting inwardly from the first surface 136 of the impact plate 110 (i.e., projecting toward the second surface 138) may have a groove width 142 that gradually decreases in size as it extends from adjacent the perimeter edge 116 of the plate 110 toward the center 146 of the plate 110. As the first surface groove 132 extends from the center 146 toward the perimeter edge 116 of the plate 110, the groove width 142 may gradually increase in size. This is just one example, and it is contemplated herein, that the groove width 142 may remain constant across the plate 110.

Continuing, a second surface groove 134 projecting inwardly from the second surface 138 of the plate 110 (i.e., projecting toward the first surface 136) may comprise an opposing groove language so as to maintain consistent impact performance and elasticity throughout the first surface 136 and second surface 138. For example, the second groove width 142 may counteract the decrease in surface area on the first surface 136 due to the first surface groove 132 with an increase of surface area on the second surface 138. In particular, aspects of the impact plate 110 may have opposing groove widths 142 along the second surface groove 134 by comprising a second surface groove width 142 that gradually increases as it extends adjacent the perimeter edge 116 of the plate 110 toward the center 146 and then decreases in groove width 142 as it passes through the center of the plate 110 and extends toward the perimeter edge 116.

It is also contemplated that, in aspects, the surface grooves (e.g., 132, 134) may further comprise an opposing curved language. For example, in aspects where a curvature is applied to the first surface grooves 132 as they extend across the first surface 136 of the impact plate 110, the second surface grooves 134 may have an opposing curvature applied to them as they extend across the second surface 138 to maintain consistent surface area along both surfaces for impact attenuation.

Continuing with this aspect, where a first surface groove 132 intersects a second surface groove 134, at least one of the plurality of openings 130 is created to provide a mesh structure 122 in the plate 110. The at least one opening 130 of the plurality of openings may extend entirely through the plate thickness 124, from the first surface 136 to the second surface 138. As a greater number of first surface grooves 132 and second surface grooves 134 are applied to both the first and second surfaces 136, 138 of the plate 110, a greater amount of openings (e.g., 130) are created. While greater the amount of openings (e.g. 130) allow for a greater amount of ventilation and moldability through the impact plate, the intersections of the grooves 132, 134 at these openings 130 may be vulnerable to tearing as the impact plate 110 may be continuously remolded. It is contemplated that the point of intersection of a surface groove (e.g., 132) that intersects a second groove (e.g., 134) may have a curvature so as to prevent tearing. As such, in aspects, the intersection points of the plurality of grooves may have an intersection radius of curvature from about 0.1 mm to 0.4 mm.

Although not shown, in other aspects, the plurality of openings (e.g., 130) may be formed by a network of walls that form a honeycomb-like structure. The network of walls may form a series of tubular cells that are similar to hexagonal prisms in which the opposing bases of each cell are open-ended. As such, the plate may include various openings extending entirely through the plate thickness, from the first surface to the second surface. Each wall may have various dimensions. For example, each wall may include a wall height that extends from the first surface to the second surface, and the wall height may constitute the plate thickness at that particular position of the plate body.

As depicted in FIG. 1A, certain aspects of the impact plate 110 have a stitching channel 114 positioned proximate the perimeter edge 116 of the impact plate 110. The stitching channel 114 provides an exemplary means of attachment of the impact plate 110 to an apparel item or a cushioning element through the application of a stitch through the stitching channel 114. Generally, the stitching channel 114 is formed by a decrease in plate thickness 124 between the first surface 136 and the second surface 138 of the impact plate 110, allowing the plate 110 to be punctured when stitched or otherwise coupled to the apparel item or cushioning element. For example, the stitching channel 114 may have a plate thickness 124 in a range of 1 mm and 3 mm between the first surface 136 and second surface 138. Further, the stitching channel 114 may be positioned proximate to the perimeter edge 116 at a distance between 4 mm to 9 mm from the perimeter edge 116. However, these quantities and ranges are merely exemplary of aspects of the disclosure, and other aspects may include a distance from the perimeter edge 116 that is greater than, or less than, the specified ranges.

In exemplary aspects comprising a stitching channel 114, peak impact pressure points may be created around the stitching channel 114 when the plate 110 is subjected to an impact force, which may limit the impact attenuation of the plate 110. Hence, aspects of the invention include zones (e.g., interior portion 148) that minimize impact pressure peak points. As depicted in FIG. 1A and FIG. 1C, the interior portion 148 includes an increase in plate thickness 124 and comprises little to no openings 130 so as to preserve the overall impact attenuation features of the impact plate 110. Hence, the interior portion 148 may reinforce the peak pressure point of an impact plate resulting from a decrease in thickness. For example, the interior portion 148 may have interior portion width 140 of 5 mm to 20 mm, measured from the stitching channel 114 extending toward the center 146 of the impact plate 110.

As noted, the impact plate 110 may have elastic properties such that it may be repeatedly molded and remolded to fit a wearer's body surface. Based on the moldable and elastic properties of the impact plate 110, it may be more vulnerable to tearing. Accordingly, aspects of the impact plate 110 include features and dimensions to prevent fracture or tearing of the impact plate 110 through the remolding process. In particular, and as discussed above, the point of intersection of a first surface groove 132 and a second surface groove 134 may have a smooth corner having a radius of curvature within a range between 0.15 mm to 0.5 mm. Further, in aspects, a corner of the stitching channel (e.g., 108a, 108b in FIG. 1C) may have a radius of curvature. For example, the stitching channel corner 108a and 108b may have a radius of curvature from 0.3 mm to 0.7 mm.

Figure 2:
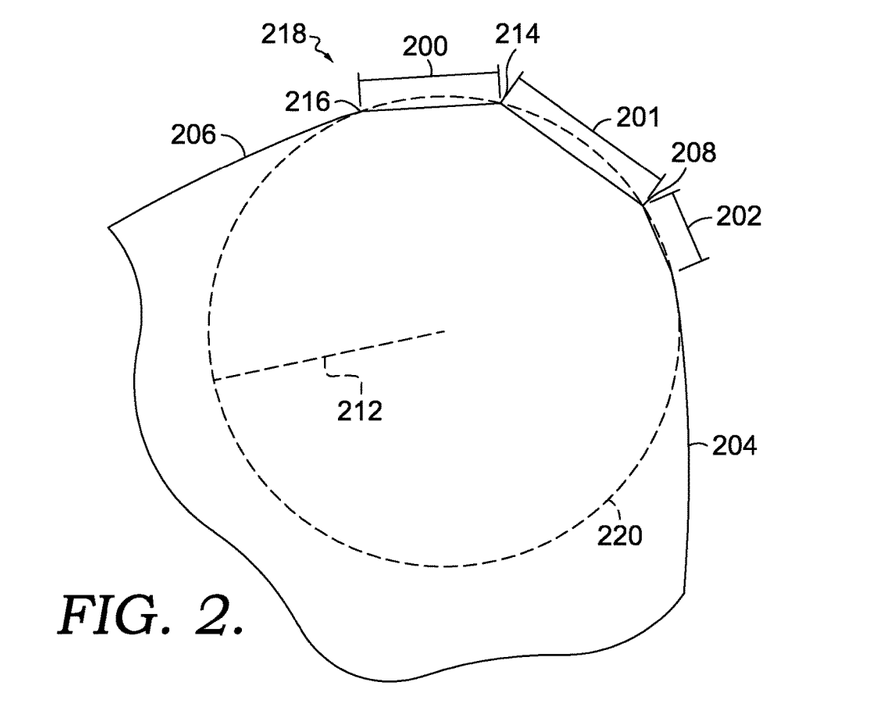
FIG. 2 depicts an exemplary hypothetical circle drawn through an exemplary non-curved corner in accordance with aspects herein.

Turning now to FIG. 2, it depicts aspects of an impact plate comprising a perimeter edge corner 218 that does not have a smooth curvature but still maintains a predetermined radius of curvature 212. The perimeter edge corner 218 may be substantially curved based on a series of perimeter edge sides 200, 201, 202 and a series of corners 208, 214, 216 that provide an overall gradual transition from a first side 204 of the impact plate to a second side 206 of the impact plate. It is contemplated that a series of perimeter edge sides 200, 201, 202 having a series of corners 208, 214, 216 may have the same impact attenuation qualities as a perimeter edge corner comprising a smooth, curved transition (as depicted in FIG. 1A, for example). While the series of corners 208, 214, 216 are depicted as being angular or pointed, it is contemplated that the series of corners may be rounded or substantially rounded.

Continuing, while the perimeter edge corner 218 is substantially curved through the use of multiple perimeter edge sides, it may still comprise a predetermined radius of curvature 212. The substantially curved corner may minimize pressure peak points through a gradual transition from the first perimeter edge side 204 to the second perimeter edge side 206. In particular, the series of corners 208, 214, and 216 may be defined by a series of perimeter edge sides 200, 201, 202. A hypothetical circle 220 may be drawn through parts of the perimeter edge corner 218 based on an incremental transition from a first side 204 to a second side 206, despite the perimeter edge corner 218 comprising series of perimeter edge sides 200, 201, 202 having a series of corners 208, 214, 216. For example, the hypothetical circle 220 may be traced substantially through the series corners 208, 214, 216 to create the hypothetical circle 220. The radius of curvature 212 of a non-curved, or a substantially curved, corner may then be defined by the radius of the hypothetical circle 220. Accordingly, the impact attenuation advantages of a predetermined radius of curvature 212 may achieved by perimeter edge corner 218 that does not have an entirely smooth, rounded corner.

Figure 3A:
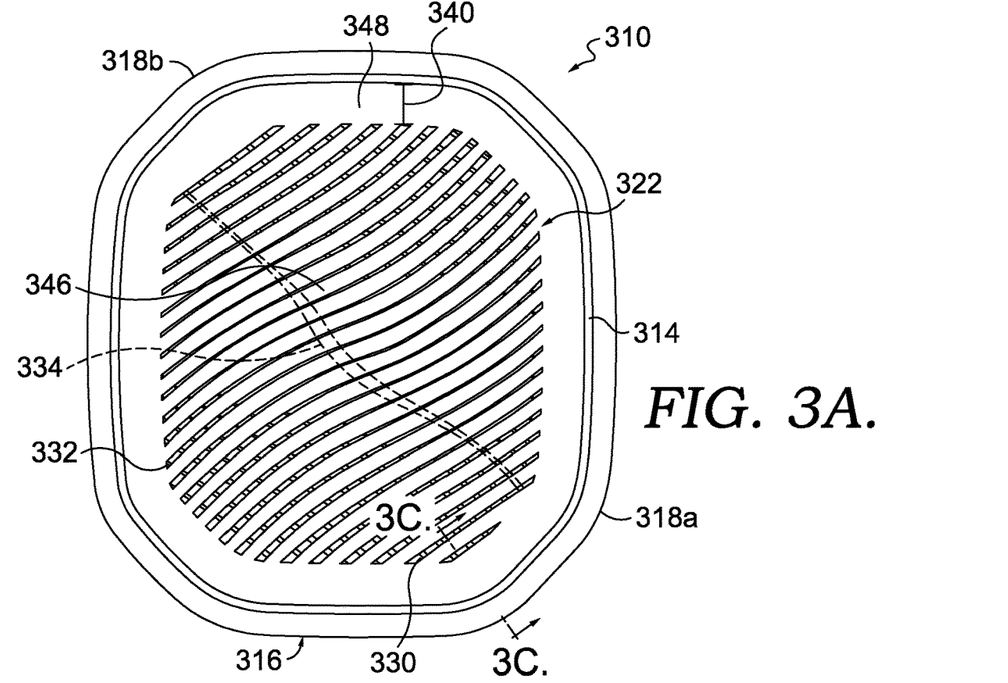
FIG. 3A depicts a plan view of an exemplary impact plate comprising a plurality of curved corners having a predetermined radius of curvature in accordance with aspects herein.

Turning now to FIG. 3A, it depicts an alternative shape of an impact plate 310 comprising a plurality of perimeter edge corners, all of which have a predetermined radius of curvature in accordance with aspects herein. In exemplary aspects, the impact plate 310 is defined by a perimeter edge 316 comprising a plurality of perimeter edge corners such as perimeter edge corners 318a and 318b. In aspects, the plurality of perimeter edge corners 318a and 318b may have a predetermined radius of curvature 312. The plurality of perimeter edge corners 318a and 318b may have a predetermined radius of curvature 312 as shown in FIG. 3B that is selected specifically for its impact attenuation properties.

Figure 3B:
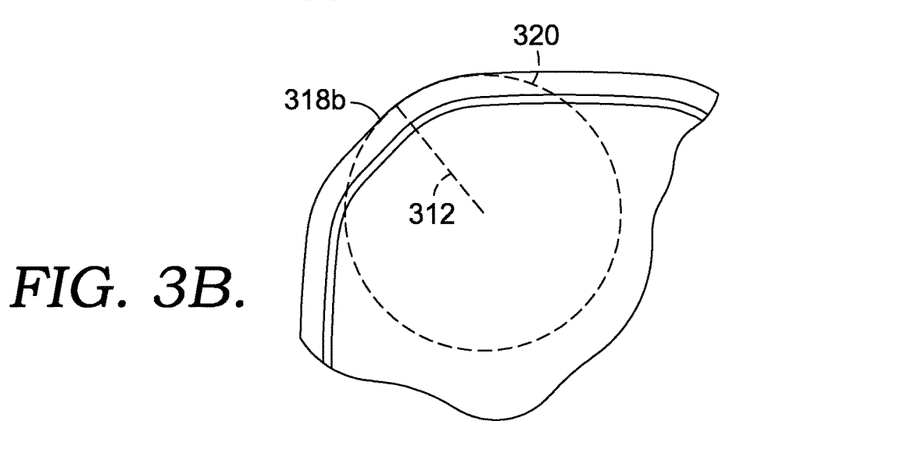
FIG. 3B depicts an enlarged view of one of the plurality of curved corner having the predetermined radius of curvature in accordance with aspects herein.

With continued reference to FIG. 3B, the predetermined radius of curvature 312 may be determined. In particular, the radius of curvature 312 may be determined by drawing a hypothetical circle 320 that substantially fits the normal selection of one of the plurality of perimeter edge corners 318b. The radius 312 of the hypothetical circle 320 thus represents the radius of curvature 312 of one of the plurality of perimeter edge corners 318b. In aspects, the predetermined radius of curvature 312 is selected from a range between 18 mm to 28 mm. In exemplary aspects, the predetermined radius of curvature 312 is 23 mm. However, these quantities and ranges are merely exemplary of aspects of the disclosure, and other aspects may include a radius of curvature that is greater than, or less than, the specified ranges.

Figure 3C:
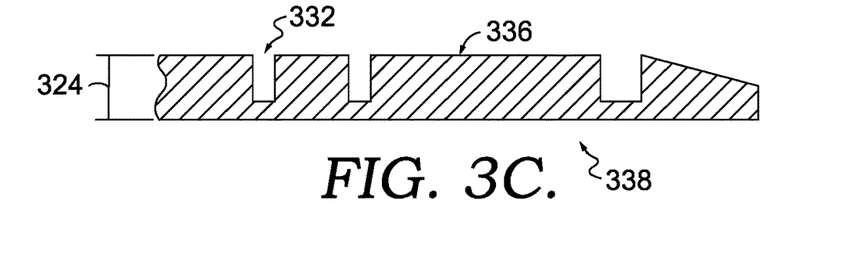
FIG. 3C depicts an enlarged cross-sectional view of the impact plate taken at cut line 3C of FIG. 3A in accordance with aspects herein.

Additionally, the impact plate 310 may comprise a plate thickness 324 that is relatively uniform and extends between a first surface 336 and a second surface 338, as depicted in FIG. 3C. In aspects, the plate thickness 324 may be relatively uniform and may be between 4 mm to 7 mm. The plate thickness 324 is said to be relatively uniform as some exemplary aspects have varying plate thicknesses due to the impact plate 310 comprising a stitching channel 314 and/or a mesh structure 322, among other features. As previously mentioned, the plate thickness 324 of the impact plate 310 may be selected to optimize both the moldability and impact attenuation functionality of the impact plate 310. For example, an increase in plate thickness may decrease the elasticity of an impact plate and may negatively affect a wearer's ability to configure the impact plate to the wearer's body surface. Conversely, a decrease in plate thickness may increase the elasticity of an impact plate and may fail to provide adequate protection from an impact force and thereby fail industry-standard regulations set forth by organizations.

Continuing with reference to FIG. 3A, exemplary aspects may further comprise a stitching channel 314 on the first surface 326 of the impact plate 310. The stitching channel 314 may be positioned proximate the perimeter edge 316 and may have a decrease in a plate thickness 324 so as to allow for a means of coupling the impact plate 310 to a foam layer (not shown) or an apparel item (not shown) by way of a stitch. For example, the impact plate 310 may be coupled to an apparel item by applying a stitch through both the stitching channel 314 and the apparel item, thereby coupling the impact plate 310 to the apparel item.

In aspects where the impact plate 310 may comprise a stitching channel 314, portions of the impact plate 310 may be vulnerable impact pressure peak points. Accordingly, in exemplary aspects, the impact plate 310 may comprise an interior portion 348 with the generally uniform plate thickness 324 and with little to no openings so as to preserve the impact attenuation features of the impact plate 310. For example, the interior portion 348 may have an interior portion width 340 of 5 mm to 20 mm, measured from the stitching channel 314 extending toward the center 346 of the impact plate 310.

With reference still to FIG. 3A, the mesh structure 322 may comprise one or more first surface grooves 332 and one or more second surface grooves 334. As described above with reference to FIG. 1A-1D, one or more of the first surface grooves 332 may intersect one or more of second surface grooves 334 to create an opening 330 of the mesh structure 322. It is contemplated that where the one or more first surface grooves 332 intersects the one or more second surface grooves 334 the corners at the point of intersection are curved so as to augment the structural integrity of the impact plate 310 and reduce the chance of tearing as a result of repeated remolding of the impact plate 310. In some aspects, these mesh intersections have a radius of curvature from about 0.1 mm to 0.4 mm.

Figure 4A:
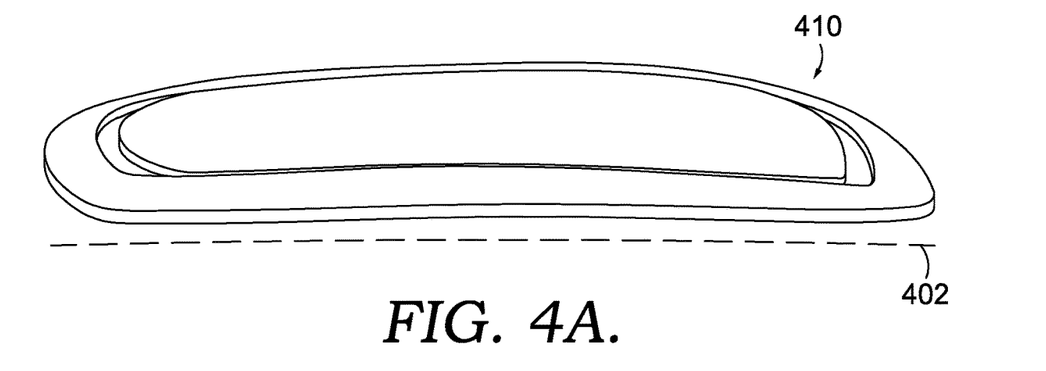
FIG. 4A depicts a side perspective view of an exemplary impact plate comprising moldable characteristics in accordance with aspects herein.
Figure 4B:
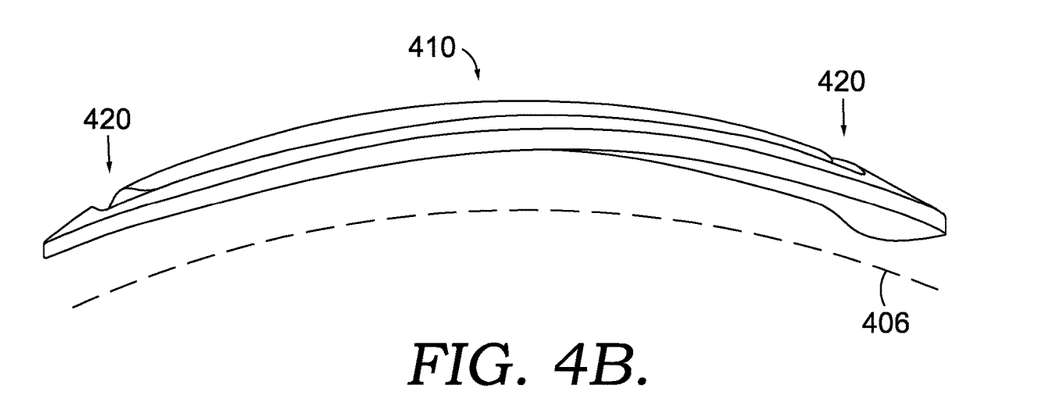
FIG. 4B depicts the impact plate of FIG. 4A molded to an alternative configuration in accordance with aspects herein.

Referring now to FIGS. 4A and 4B, an impact plate 410, which may comprise the impact plate 110 or the impact plate 310, having moldable characteristics is depicted. The material properties of the material used to construct the impact plate 410 contributes to its remoldability characteristics and its impact attenuation qualities. In aspects, the material properties of the material used in the impact plate 410 have an elastomeric quality such that the impact plate 410 may elastically deform at a wide range of temperatures yet remain sufficiently rigid so as to redistribute an impact force over the surface of the impact plate 410. In addition, the impact plate 410 may comprise a specific impact strength to adequately absorb the energy from an impact force without fracturing.

In an exemplary aspect, the impact plate 410 may comprise a polymeric material having elastomeric qualities. For instance, the polymeric material may be a polyurethane based polymer. The polymer may comprise various components, including a polyol or a mixture of polyols and an isocyanate including a chain extender. The polymer may further comprise auxiliary components, such as a catalyst, a defoaming agent, a curing agent, a blowing agent, or a colorant.

Among other things, the polyol or mixture of polyols provides functional hydroxyl groups for reaction (i.e., acts as nucleophile). In addition, the mixture of polyol one or more polyols may be selected in various ratios (e.g., based on molecular weight) to achieve a material having a certain tensile strength. For example, higher ratio (i.e., a greater molecular weight of polyol) can yield more elastic polyurethane while a lower ratio (i.e., a lower molecular weight of polyol) can yield a more rigid polymer. Exemplary polyols include an ester, ether, caprolactone, and siloxane.

The isocyanate provides isocyanate groups for the reaction (i.e., acts as electrophile), and diisocyanates may be used, such as methyldiisocyanate (MDI), hexamethylene diisocyanate, and aliphatic diisocyanate. The ratio of isocyanate may also influence the hardness of the polymer. The chain extenders may include a diol to extend polymer chains, provide hydroxide groups, and influence various properties, such as flexibility or rigidity.

Generally, the catalyst may help speed up reactions of the polyurethane and may be used to promote desired reactions in the polyurethane formulation. This may further impact the properties of the resulting composition. As known in the art, a number of suitable catalysts may be used in the polymer, including a metal catalyst (e.g., stannous octoate, bismuth, zinc, and the like).

Exemplary aspects of the polymer may comprise a defoaming agent ("anti-foaming agent," "antifoamer"), which aids in removing a trapped gas (e.g., air) from a polymeric material during processing. A defoamer may function as a surface tension depressant, a lubricant, and/or a wetting agent to promote gas release. An example of a defoamer comprises a silicone, a hydrocarbon, a fluorocarbon, a polyether, or a combination thereof.

In exemplary aspects, the impact plate 410 may also comprise other auxiliary components such as a blowing agent, a curing agent, or a colorant. For example, any suitable blowing agent may be selected to assist in regulating the cellular structure of the polymer during processing. In particular, any suitable blowing agent may be used to impact the size and distribution of the cells throughout the polymer to create the material properties described herein. With regard the curing agent or colorant, any suitable curing agent or colorant may be used.

In exemplary aspects, the impact plate 410 may comprise a polymeric material comprising a polyol within the ranges from 47% to 50% of the overall weight of the material. Additionally, the polyurethane may make up around 43% to 47% of the overall weight of the material. The remaining percentages of the material may comprise a curing agent (2.9% to 6.9%), catalyst (0.05% to 0.09%), blowing agent (0.15% to 0.35%), a defoaming agent (0.15% to 0.35%), and a colorant (0.29% to 0.69%). An exemplary polymeric material may comprise a polymeric material manufactured by Yayork Palstical Products Shenzhen Co., Ltd. of Shenzhen, China.

The impact plate 410 may include other components that are in addition to, or in lieu of, the above listed elements. In addition, the impact plate 410 may include other polymers in addition (or instead of) polyurethane having the following described material properties. In exemplary aspects, the impact plate 410 may comprise a polymeric material having an tensile strength that enables the moldability and remoldability of the impact plate 410 at a wide range of temperatures and without the use of external elements, such as water or heat. The tensile strength of the material used in the impact plate 410 allows for an elastomeric quality such that the impact plate 410 elastically deforms under a given stress from a first configuration to a second configuration (e.g., different curvature) and returns to its pre-stressed configuration when the stress is removed.

In addition, the impact plate 410 may substantially retain its newly created configuration with a stress or force provided by, for instance, an elastically resilient material. While the tensile strength of the impact plate 410 may dictate the tendency of the impact plate 410 to return to its initial configuration upon removing the one or more external forces 420, the impact plate 410 may comprise a polymeric material that has a tensile strength that allows the impact plate 410 to substantially maintain its configuration when coupled to an elastically resilient layer of an apparel item. Accordingly, the configuration of the impact plate 410 is maintained when the apparel item is worn by the user. Said differently, the elastically resilient material of the apparel item may exert a second external force that is sufficient to maintain the configuration of the impact plate 410 when the apparel item is worn by a wearer.

The tensile strength is the maximum stress level the polymeric material can withstand and is determined by national standard tensile strength tests, such as the test and standards prescribed by ASTM D638. For instance, the tensile strength of the polymeric material may be determined using the ASTM D638-14 test method with a specimen thickness of 3.1 mm, a testing speed of 50 mm/min, a gauge length of 25 mm, and at conditions of 23 degrees Celsius and 50% relative humidity for 48 hours. With regard to FIG. 4A, the impact plate 410 may comprise the polymeric material having a tensile strength described herein that allows the plate to be molded from a first configuration 402 to a second configuration 406 (shown in FIG. 4B) through the application of the one or more external forces 420. Hence, forming the impact plate 410 out of polymeric material having the tensile strength described herein allows the impact plate 410 to be molded (and remolded) according to the user's comfort without the introduction of heat or curing agents (e.g., water).

Further, the tensile strength of the polymeric material used in the impact plate 410 enables the impact plate 410 to be molded at a wide range of temperatures, including from 0 degrees Celsius to 40 degrees Celsius. For example, the impact plate 410 may be moldable to a first position with an application of a first external force at a first temperature between 0 degrees Celsius and 40 degrees Celsius. The impact plate may then be remoldable to a second position with the application of a second external force at a second temperature between 0 degrees Celsius and 40 degrees Celsius.

In exemplary aspects, the tensile strength for the polymeric material used in the impact plate 410 is selected within the range of about 40 MPa to 50 MPa, according to the testing procedures set forth under ASTM D638. In yet another aspect, the tensile strength of the polymeric material used in the impact plate 410 is 44.6 MPa.

It should be appreciated that the polymeric material used in the impact plate may also be defined by a measure of ductility (such as the test specimen's elongation at break). This tensile property may be determined, for example, using the same standards and procedures used to determine the tensile strength, such as those prescribed by ASTM D638 described above. The elongation at break of the polymeric material may be defined by the change in axial length divided by the original length of a test specimen after fracture. While the tensile strength is referred to primarily in the present application, the elongation at break of the polymeric material may further define the polymer used in the impact plate 410. In exemplary aspects, the impact plate 410 may be formed of a polymeric material having an elongation at break within the range of 200% to 250%. In another aspect, the elongation at break may be 222%.

Figure 5:
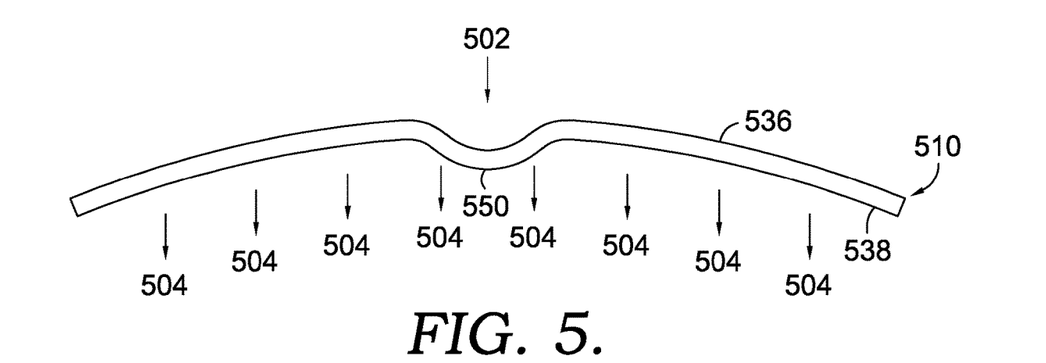
FIG. 5 depicts an exemplary impact plate subjected to an impact force in accordance with aspects herein.

Turning now to FIG. 5, it depicts an exemplary impact 510 that is subjected to an impact force 502 in accordance with aspects herein. While the impact plate 510 may have elastic qualities, it may also be sufficiently stiff or rigid so as to redistribute an impact force 502 occurring at the first surface 536 across the second surface 538 of the plate 510, resulting in one or more smaller impact forces 504 along the second surface 538. In particular, the polymeric material having the tensile strength described herein may allow aspects of the present invention to partially absorb a portion of the impact force through elastic deformation 550 but remain sufficiently rigid so as to simultaneously diffuse the impact force 502 throughout the impact plate body and onto the second surface 538. Accordingly, the material properties of the polymeric material used in the impact plate 510 allow it to pass impact test standards and protect the wearer from impact forces.

Further, the specific impact strength of the polymeric material may contribute to the impact resistant characteristics of the impact plate 510. In aspects, the impact plate 510 may comprise a polymeric material having an impact strength so as to absorb a certain amount of energy without fracturing. For example, when the first surface 536 of the impact plate 510 is subjected to an impact force 502, the specific impact strength of the polymeric material contributes to the impact plate's ability to absorb an impact force and transfer that force throughout the plate body and onto the second surface 528 without fracturing. That is, the impact plate 510 may withstand a sudden impact force without cracking or fracturing.

Various methods exist for determining the impact strength, such as the IZOD Impact Test as set forth in ASTM D256. For instance, using ASTM D256-2010 Method A with a capacity of the pendulum of 22 J, an Izod impact resistance ("impact strength") for a partial break in a test specimen may be determined. In exemplary aspects, the impact plate 510 may comprise a polymeric material having an impact strength in the range of about 1100 J/m to 1400 J/m, as tested under the standards set forth by ASTM D256. In still other aspects, the impact plate 510 may comprise having an impact strength of 1287 J/m, according to ASTM D256 standards.

One functional advantage of an impact plate comprising a polymeric material having the properties described herein, or the optimized dimensions described above, is that the impact plate may pass impact testing mechanisms, such as those set out in U.S. Pat. No. 8,997,579, which is hereby incorporated in its entirety. Accordingly, aspects of the impact plate described are capable of withstanding impact forces and protecting a wearer, while still being capable of being molded and remolded at a wide range of temperatures and without the use of heat or external curing agents.

Figure 6:
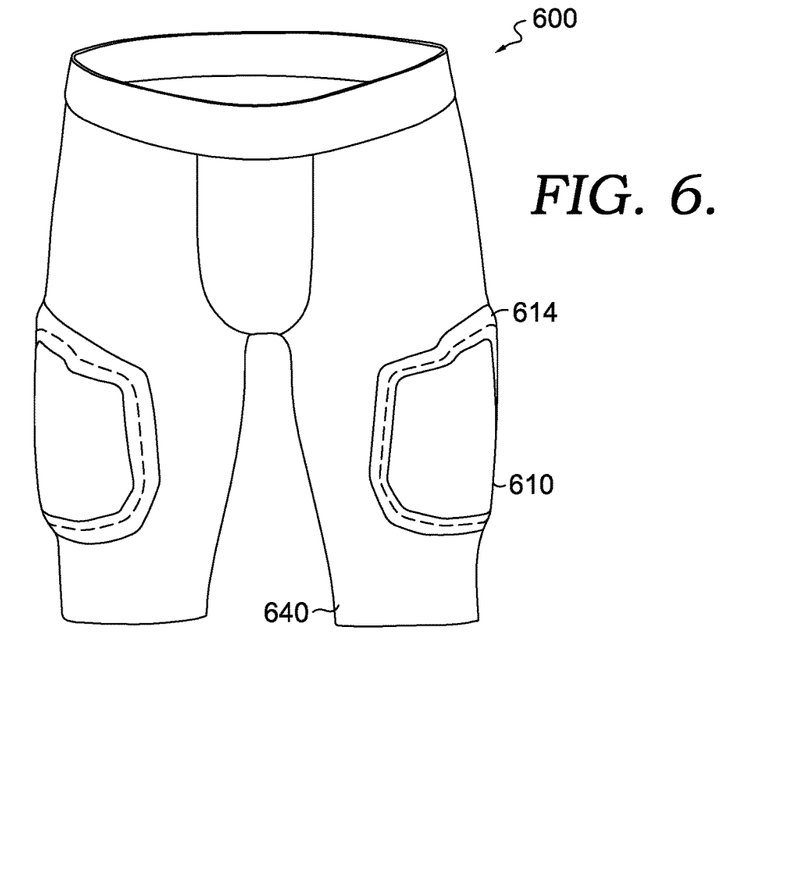
FIG. 6 depicts an exemplary impact plate incorporated into an exemplary apparel item in accordance with aspects herein.

FIG. 6 depicts aspects of the invention where an impact plate 610 may be coupled, directly or indirectly, to a textile layer or garment layer of an apparel item 600. Various aspects of the present invention may comprise using the impact plate 610 as a tailbone plate, an elbow plate, a chest plate, a thigh plate, and the like. Accordingly, impact plate 610 may protect the wearer when coupled to a suitable apparel item (e.g., shirt, jacket, shorts, and pants).

As depicted, the apparel item may be formed by a textile layer 640. The textile layer 640 may comprise, in part, an elastically resilient material generated through, for instance, a knitting or a weaving process. The elasticity may be achieved through use of one or more synthetic or natural elastic yarns, fibers, or filaments such as Spandex, elastane, rubber, Lycra, and the like. As used throughout this disclosure, the term elastically resilient may be defined as the ability of a material to stretch in response to a force and to return to a non-stretched state when the force is removed. The textile layer 640 may exhibit two-way stretch or four-way stretch. Any and all aspects, and any variation thereof, are contemplated as being within aspects herein.

In exemplary aspects, a user may configure the impact plate 610 to a specific configuration so as to fit the wearer's body surface. For example, before removably attaching the impact plate 610 to the textile layer 640, the wearer may apply to force to curve the plate to fit the wearer's thigh surface as described above with reference to FIGS. 4A-B. The elastically resilient material of the textile layer 640 may provide an adequate external force to maintain the molded configuration of the impact plate 610 when the apparel item 600 is worn by the user. In another example, the impact plate 610 may be permanently affixed to the apparel item 610. When the wearer dons the apparel item 600, the impact plate 610 would mold to conform to the surface topography of, for instance, the wearer's thigh. Again, the elastically resilient material of the textile layer 640 would provide an adequate external force to maintain the molded configuration of the impact plate 610.

Generally, the impact plate 610 may be coupled to the textile layer 640 using various techniques. For example, the impact plate may be bonded or adhered directly to the textile layer 640, or bonded by a trim or other textile-coupling technique. Alternatively, the impact plate 610 may be coupled to the textile layer 640 using various mechanical coupling mechanisms. For example, the impact plate 610 may be coupled to the textile layer by applying a stitch 614 through the impact plate 610 and through a surface of a textile layer 640 (using, for instance, a stitching channel). Alternatively, the impact plate 610 may be coupled to the textile layer 640 using hook-and-loop fasteners, rivets, or other mechanical fasteners. As stated above, the impact plate 610 may be removably affixed or permanently affixed to the textile layer 640.

Figure 7:
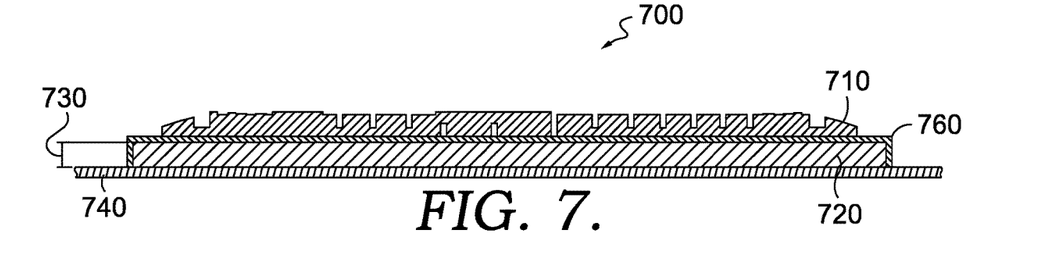
FIG. 7 depicts a cross-sectional view of an exemplary impact plate and an exemplary cushioning element in accordance with aspects herein.

FIG. 7 depicts a cross-sectional view of an impact plate 710 and cushioning element, such as a foam layer 720, of an exemplary impact pad 700. The impact pad 700 may be integrated or coupled to a textile layer of an apparel item, as described with reference to FIG. 6. Generally, the cushioning element may be positioned between the impact plate 710 and the wearer's body. As such, the cushioning element, such as the foam layer 720, provides additional protection for impact attenuation.

As depicted in FIG. 7, exemplary aspects of the impact pad 700 may comprise a foam layer 720 that is a substrate layer of a first surface 760 of a textile layer. Accordingly, the foam layer 720 may be integrated into the textile layer such that it is enveloped by the textile layer. That is, the foam layer 720 may be surrounded or enclosed by a pocket formed by a first surface 760 of textile layer and a second surface 740 of a textile layer. However, this is only one aspect of the present invention. Other aspects may rearrange how the foam layer 720 is integrated or otherwise coupled to the apparel item. For example, the foam layer 720 may be coupled to a top surface (e.g., an outer-facing surface) of the of the textile layer such that it may be positioned between the impact plate 710 and the textile layer. Any and all aspects, and any variation thereof, are contemplated as being within aspects herein.

With regard to the impact plate 710, it too may also be integrated or coupled to a textile layer of an apparel item. Alternatively or in addition, the impact plate 710 may be coupled to the foam layer 720. For example, the impact plate 710 may be indirectly affixed to the foam layer 720 via the first surface 760 of the textile layer. In other aspects, the impact plate 710 may be directly affixed to the foam layer 720 which, in turn, is coupled to the outerfacing surface of the textile layer. Though the impact plate 710 is described as being affixed or coupled, it is contemplated that this may include a removable or permanent attachment.

The dimensions, shapes, and materials utilized within cushioning element may vary with the overall properties of the materials chosen. That is, by changing the dimensions, shapes, and materials utilized within cushioning element, the compressibility, impact force attenuation, flex, stretch, breathability, and overall mass of cushioning element may be tailored to specific purposes or products.

For example, the cushioning element may comprise a foam layer 720 that may include a composite of materials such as rubber and low-density polyethylene (e.g., 60% rubber and 40% LDPE). And in other aspects, the foam layer 720 may include a polyamide 6 (e.g., Nylon 6) composition. The material from which the foam layer 720 is constructed may exhibit different characteristics, such as a particular impact-attenuation performance, hydrophobicity, shrink resistance, and overall weight. In this respect, a polyamide-6 foam may provide better hydrophobicity, shrink resistance, and lower weight, as compared with a composite of rubber and low-density polyethylene. In a further aspect, the foam layer 720 includes a cushioning element thickness 730 in a range of about 5 mm to about 9 mm.

Figure 8:
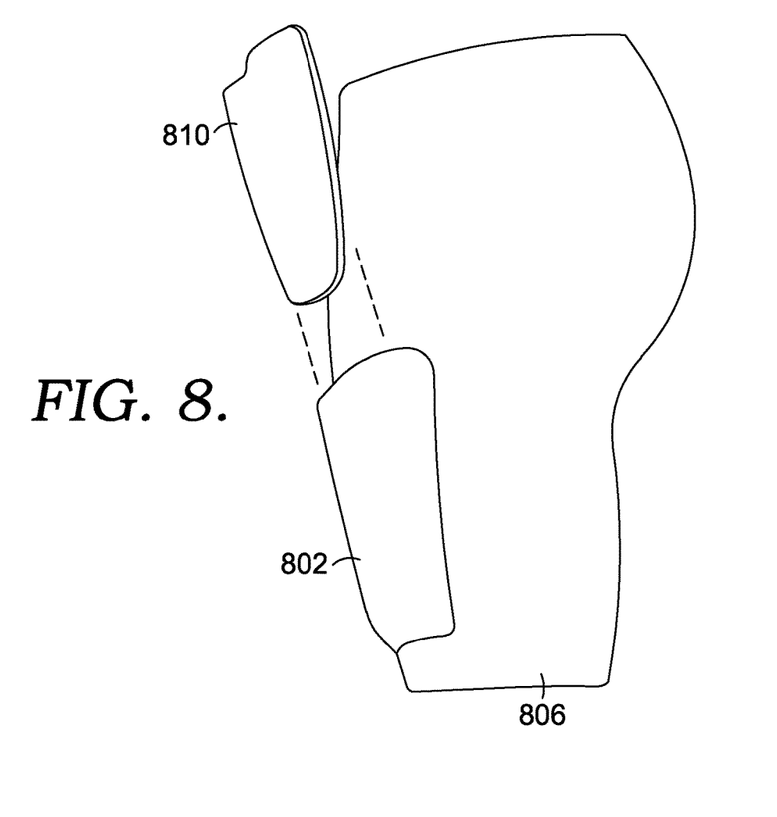
FIG. 8 depicts an exemplary pocket of an apparel item configured to receive an exemplary impact plate in accordance with aspects herein.

Referring now to FIG. 8, aspects of an impact plate 810 may be received within a pocket of an apparel item 806.

More specifically, the impact plate 810 may be configured or shaped in order to be received within a pocket 802 of the apparel item 806. As described above, the apparel item 810 may be formed, in part, from an elastically resilient material generated through a knitting or a weaving process.

Additionally, the apparel item 806 may comprise a pocket 802 that removably retains the impact plate 810 so as to secure the impact plate 810 to the wearer's body surface, thereby protecting a portion of the wearer, such as the thigh, ankle, arm, back, and the like, from the an impact force (not shown). In further aspects, a cushioning element, such as those described with reference to FIG. 7, may be coupled to the impact plate 810 so as to comprise an impact pad that may be removably retained within a pocket 802 of the apparel item 806. In alternative aspects, the cushioning element may be a substrate layer of the apparel item 806 so that only the impact plate 810 (and not the cushioning element) is removably retained within the pocket.

The moldable characteristics of the impact plate 810 allow it to be molded from a first configuration to a second configuration (as depicted in FIG. 4). Then, the impact plate 810 may be received into the pocket 802, as depicted in FIG. 8. The elastically resilient material may thus maintain the second configuration of the impact plate when the apparel item 806 is worn by the individual. Alternatively, the impact plate 810 may comprise a first configuration prior to being received within the pocket 802 and a second configuration after being received within the pocket 802. In other words, the impact plate 810 may mold to the surface topography of the wearer's thigh area after being inserted into the pocket 802. Any and all aspects, and any variation thereof, are contemplated as being within aspects herein.

Figure 9:
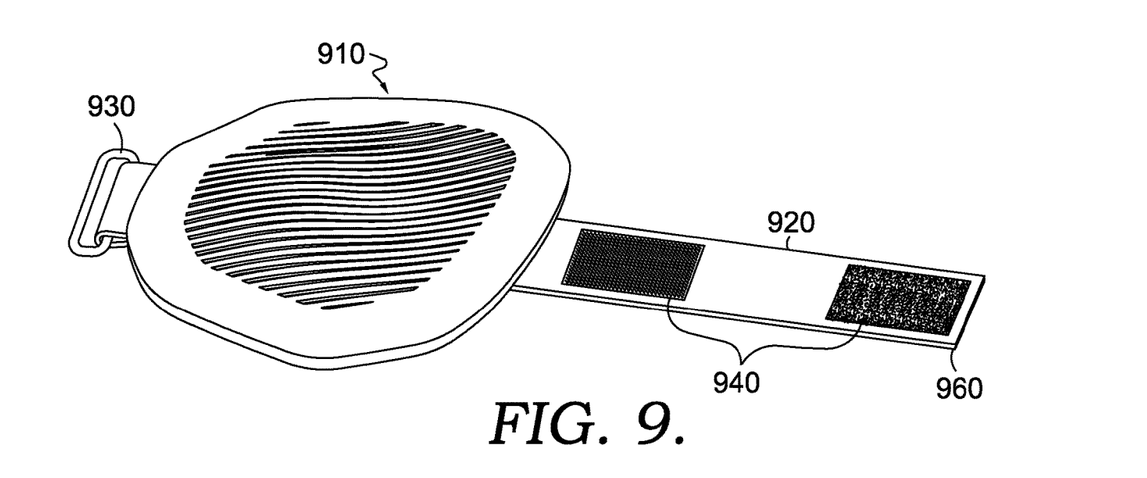
FIG. 9 depicts an exemplary impact plate having a flexible strap in accordance with aspects herein.

FIG. 9 illustrates an aspect of an impact plate 910 coupled to a flexible strap 920. The impact plate 910 may be coupled to the flexible strap 920 by various methods, including using hook-and-loop fasteners, stitching, adhesives, rivets or other mechanical fasteners, and the like. The flexible strap 920 is adjustable so that it tightens or loosens to secure the impact plate 910 to the wearer's body accordingly. The flexible strap 920 may have a loop buckle 930 at first end to receive the second end 960 of the flexible strap 920, although other securing means are contemplated as being within aspects herein (snaps, buttons, other types of buckles, and the like). The flexible strap 920 may be secured to a wearer's body by sliding the second end 960 through the loop buckle 930 and fastening the flexible strap 920 by way of a hook-and-loop fastener 940.

In aspects, the impact plate 910 may be molded from a first configuration to a second configuration with the use of an external force at a wide range of temperatures, such as 0 degrees Celsius to 40 degrees Celsius, and without the use of any external elements, such as temperature or water, to cure the impact plate 910. Accordingly, a wearer may mold the impact plate to the second configuration to fit the wearer's body surface. Due to the moldable characteristics of the impact plate 910, the impact plate 910 substantially maintains the second configuration from a tightening of the flexible strap 920, thereby securing the impact plate 910 to the wearer's body surface. In other words, the flexible strap 920 helps to maintain the impact plate 910 in the second configuration. In further aspects, the impact plate 910 may be further coupled to a cushioning element (not shown) to form an impact pad. The impact pad may then be coupled to the flexible strap 920 and moldable to fit a wearer's body surface.

The present invention has been described in relation to particular examples, which are intended in all respects to be illustrative rather than restrictive. Alternative embodiments will become apparent to those of ordinary skill in the art to which the present invention pertains without departing from its scope. Certain features and subcombinations are of utility and may be employed without reference to other features and subcombinations and are contemplated within the scope of the disclosure and the claims.

What is claimed is:

1. An impact plate comprising:
    a moldable plate having a center, a first surface, and a second surface opposite the first surface, the first surface and the second surface defining a thickness therebetween, wherein
    a mesh structure is formed by a plurality of first grooves on the first surface intersecting a plurality of second grooves on the second surface,
    the moldable plate comprises the mesh structure having a plurality of openings,
    the moldable plate comprises a stitching channel on the first surface,
    the thickness is between 4.0 mm to 7.0 mm,
    the moldable plate is defined by a perimeter edge,
    the thickness is tapered near the perimeter edge, and
    the perimeter edge comprises one or more curved corners having a predetermined radius of curvature between 18 mm to 28 mm.

2. The impact plate of claim 1, wherein the predetermined radius of curvature of the one or more curved corners is 23 mm.

3. The impact plate of claim 1, wherein the one or more curved corners of the moldable plate have the predetermined radius of curvature.

4. The impact plate of claim 1, further wherein the moldable plate comprises a polymeric material having a remoldable quality.

5. The impact plate of claim 4, wherein the polymeric material comprises a tensile strength of 40 MPa to 50 MPa such that the moldable plate is remoldable at a temperature between 0 degrees Celsius and 40 degrees Celsius.

* * * * *